United States Patent [19]

Powanda et al.

[11] 3,957,711

[45] May 18, 1976

[54] DISPERSION POLYMERIZATION PROCESS USING HYDROXYALKYL ACRYLATE AS PROTECTIVE COLLOIDS

[75] Inventors: Thomas M. Powanda, Middlesex; Ralph F. Patella, S. Plainfield, So. Plainfield; Edward J. Kuzma, Woodbridge, all of N.J.

[73] Assignee: Celanese Coatings & Specialties Company, Louisville, Ky.

[22] Filed: Dec. 20, 1974

[21] Appl. No.: 534,941

[52] U.S. Cl. .................. 260/29.6 RW; 260/29.6 H; 260/885; 526/202; 526/209; 526/210; 526/225; 526/303; 526/317; 526/321; 526/328; 526/335; 526/341; 526/346; 526/348
[51] Int. Cl.$^2$ .......................................... C08F 2/20
[58] Field of Search ............ 260/29.6 RW, 29.6 RB, 260/885, 29.6 H, 80 M

[56] References Cited
UNITED STATES PATENTS

| | | | |
|---|---|---|---|
| 2,671,065 | 3/1954 | Ulrich | 260/29.6 |
| 2,998,400 | 8/1961 | French | 260/29.6 |
| 3,551,366 | 12/1970 | Galinke | 260/17.4 |
| 3,876,596 | 4/1975 | Grubert et al. | 260/80 M |

FOREIGN PATENTS OR APPLICATIONS

| | | |
|---|---|---|
| 7,141,457 | 12/1971 | Japan |
| 7,141,472 | 12/1971 | Japan |

*Primary Examiner*—Joseph L. Schofer
*Assistant Examiner*—Peter F. Kulkosky
*Attorney, Agent, or Firm*—Herbert P. Price; K. A. Genoni; T. J. Morgan

[57] ABSTRACT

Aqueous dispersions of synthetic polymers have been made by polymerizing ethylenically unsaturated monomers in water in the presence of a protective colloid which is a polymer of a hydroxyalkyl acrylate or methacrylate. Such aqueous dispersions are useful in paints, adhesives and textile applications.

10 Claims, No Drawings

DISPERSION POLYMERIZATION PROCESS USING HYDROXYALKYL ACRYLATE AS PROTECTIVE COLLOIDS

BACKGROUND OF THE INVENTION

The field of art to which this invention pertains is aqueous dispersions of synthetic polymers, particularly aqueous dispersions of synthetic polymers prepared by polymerizing ethylenically unsaturated monomers in water in the presence of a protective colloid.

The use of protective colloids as stabilizers for aqueous dispersions and emulsions is well known in the art. Protective colloids are water-soluble materials which form colloidal solutions. Such materials include starch, casein, glue, shellac, polyvinyl alcohol, sodium polyacrylate, methyl cellulose, hydroxyethyl cellulose and the like. U.S. Pat. No. 2,998,400 sets forth a number of protective colloids which have been used in aqueous polymer dispersion preparations among which are polyacrylic acid, saccharide of polygalacturonic acid, gum arabic, hydroxyethyl cellulose, gelatine, citrus pectin, starch, sufonated-carboxylated starch, polyvinyl alcohol, sodium carboxymethyl cellulose, propylene glycol alginate, gum tragacanth, polyacrylamide, and vinyl methyl ether-maleic anhydride copolymer and its half amide. The use of polyacrylic acid as a protective colloid is described in U.S. Pat. No. 2,671,065. Hydroxyalkyl galactomannans as protective colloids are described in U.S. Pat. No. 3,551,366.

SUMMARY OF THE INVENTION

This invention pertains to aqueous synthetic polymer dispersions stabilized with a protective colloid. In particular, this invention relates to aqueous synthetic polymer dispersion wherein the protective colloid is a polymer of hydroxyalkyl acrylate or methacrylate. More particularly, this invention pertains to a process for preparing aqueous synthetic polymer dispersions wherein the protective colloid is prepared in situ.

By practicing the process of this invention, the particle size and solids content of the aqueous synthetic polymer dispersions can be varied within wide limits. Dispersions having thixotropic, Newtonian or dilatant flow properties can be made. Polymers can be prepared which have excellent heat stability. By controlling the molecular weight of the hydroxyalkyl arylate or methacrylate polymer, aqueous dispersions of identical formulation can be made at various viscosities. Aqueous dispersions can be made into paints which have excellent flow and levelling properties.

The aqueous dispersions made by the process of this invention are useful in the manufacture of paints and coatings, in the formulation of adhesives and in textile applications.

DESCRIPTION OF THE INVENTION

Monomers useful in the process of this invention are polymerizable ethylenically unsaturated compounds which can be homo or copolymerized depending upon the properties desired in the final product. Examples of such monomers can be found in the following classes:
A. Vinyl esters of alkanoic acids;
B. Esters of polymerizable unsaturated mono an polycarboxylic acids;
C. Polymerizable unsaturated mono and polycarboxylic acids; D. polymerizable unsaturated nitriles;
E. Polymerizable unsaturated amides;
F. Vinyl aromatics;
G. Alkenes; and
H. Alkadienes.

Examples of class A monomers are vinyl esters of organic acids having 2 to 18 carbon atoms. Examples of such esters include vinyl acetate, vinyl propionate, vinyl butyrate, vinyl benzoate, vinyl 2-ethyl-hexoate and vinyl stearate.

Examples of class B monomers are esters of polymerizable unsaturated mono and polycarboxylic acids wherein the ester group contains 1 to 18 carbon atoms and the acid contains 3 to 10 carbon atoms. Examples of such monomers are the methyl, ethyl, n-propyl, isopropyl, n-butyl, isobutyl, sec-butyl, tert-butyl, amyl, hexyl, heptyl, 2-ethylhexyl, octyl, decyl, lauryl, stearyl, cyclohexyl, isobornyl, benzyl, beta-hydroxyethyl, beta-hydroxypropyl esters of acrylic, methacrylic, crotonic, ethacrylic, cinnamic, maleic, fumaric and itaconic acids. The monomers based on polycarboxylic acids can be mono or diesters.

Examples of class C monomers are polymerizable unsaturated mono and dicarboxylic acids containing 3 to 10 carbon atoms. Examples of such acids include acrylic, methacrylic, ethacrylic, crotonic, cinnamic, maleic, fumaric and itaconic acids.

Examples of class D monomers are polymerizable unsaturated nitriles, such as acrylonitrile, methacrylonitrile, ethacrylonitrile, crotonic nitrile and the like.

Examples of class E monomers are polymerizable unsaturated amides, alkylol amides and alkoxyalkyl amides, such as acrylamide, methacrylamide, diacetone acrylamide, N-methylol acrylamide, N-methylol methacrylamide, N-methoxymethyl acrylamide, butoxymethyl acrylamide, and the like.

Vinyl aromatic monomers of class F are exemplified by such compounds as styrene, α-methyl styrene, the various vinyl toluenes, vinyl naphthalene and the like.

Polymerizable alkenes of class G can be exemplified by such compounds as ethylene, propylene, isobutylene and the like, i.e., compounds which contain one ethylenic double bond and have 2 to 10 carbon atoms.

The class H alkadienes are conjugated dienes having 4 to 8 carbon atoms. Examples of such compounds are butadiene, isoprene, chloroprene and the like.

A preferred monomer for use in this invention is vinyl acetate either polymerized alone or in combination with an alkyl acrylate, or a dialkyl maleate or fumarate, wherein the alkyl group contains 4 to 8 carbon atoms in the weight ratio of vinyl acetate to alkyl compound of 90:10 to 50:50. Also preferred are homopolymers and copolymers of alkyl acrylates and methacrylates wherein the alkyl group contains 1 to 8 carbon atoms.

The amount of water which is used in order to prepare the emulsions can be varied over a wide range. Thus, 40 to 300 parts of water can be employed for each 100 parts of monomer or comonomer. Although a large excess of water can be used, it is undesirable to do so because the yield of polymer per unit volume of reaction vessel becomes unduly small. An amount of water less than 40 parts by weight is undesirable because the viscosity of the polymerizing mixture becomes too high to permit adequate agitation. A preferred range is 75 to 125 parts of water per 100 parts of monomer Wetting agents are employed to expedite emulsification of the unsaturated material. Typical wetting agents include the well-known anionic and nonionic synthetic surfactants. Examples of anionic surfactants include alkyl aryl sodium sulfonates containing 8 to 18 carbon atoms in the alkyl radical such as dodecyl benzene sodium sulfonate and decyl benzene sodium sulfonate; sodium diisobutyl naphthalene sulfonate and sodium disulfonate of dibutyl phenyl phenol; alkyl sulfates such as sodium lauryl sulfonate; alkyl aryl polyether sulfonates; alkyl aryl polyether sulfates; and the sodium salt of dioctyl sulfo-succinate. Examples of nonionic surfactants which can be employed as emulsifying agents in the polymerizable monomer emulsion polymerization recipe include alkyl aryl polyether alcohols such as nonyl phenoxy polyoxyethylene ethanol; polyoxyethylene glycol esters of fatty acids; polyoxyethylated fatty alcohols; polyoxyethylated fatty amides and block copolymers of polyoxypropylene and polyoxyethylene wherein the polyoxypropylene portion of the molecule has a molecular weight of at least 900 and the polyoxyethylene portion of the molecule is about 10 to 90 percent, by weight. Although a wide variety of surfactants can be employed, the exact surfactant or combination of surfactants to be used will depend upon the end properties desired and is readily apparent to those having ordinary skill in this art. The amount of surfactant that is used will vary depending upon the type surfactants, the monomers that are being polymerized as well as other conditions. Generally, this amount will be from about 0.4 to about 4% by weight based on the total dispersion.

The monomer or monomers in this invention are polymerized by means of a catalytic amount of a conventional free radical polymerization catalyst or catalyst system (which can be referred to as an addition polymerization catalyst, a vinyl polymerization catalyst or a polymerization initiator). Preferably, although not necessarily, the polymerization catalyst is substantially water-soluble and soluble in the polymerization reaction mixture. Among such catalysts are inorganic peroxides such as hydrogen peroxide, alkali metal persulfates (e.g., sodium, potassium, and lithium persulfates) and ammonium persulfates, perphosphates and perborates, azonitriles, such as alpha, alpha-azo-bis-isobutyronitrile, and redox systems, including such combinations as mixtures of hydrogen peroxide, tert-butyl hydroperoxide, or the like and any of an iron salt, a titanous salt, zinc formaldehyde sulfoxylate or sodium formaldehyde sulfoxylate; ammonium or alkali metal persulfates, borates or perchlorates together with an alkali metal bisulfite such as sodium metabisulfite an alkali metal persulfate together with an arylphosphinic acid such as benzene-phosphinic acid, and the like.

The amount of catalyst that is used is that amount sufficient to catalyze substantially complete polymerization of the monomers to polymers. Generally, this amount will be from about 0.05 to about 1 percent by weight based on the total weight of the dispersion.

An alkaline buffer, such as sodium bicarbonate can be employed in order to control the pH of the system.

The protective colloids utilized in this invention are polymers of hydroxyalkyl acrylates or methacrylates wherein the alkyl group contains 2 to 4 carbon atoms. The preferred protective colloid is a polymer of beta-hydroxyethyl acrylate. The amount of protective colloid that is used will vary between about 0.2 to 2% by weight based on the total weight of the dispersion. Preferably the amount of protective colloid will be between about 0.4 to 1.6% by weight.

In carrying out the process of this invention, a polymer of a hydroxyalkyl acrylate is dissolved or dispersed in the aqueous dispersing medium prior to the polymerization of the ethylenically unsaturated monomers. This polymer of hydroxyalkyl acrylate or methacrylate can be preformed prior to addition to the water or it can be formed in situ in the water.

Preformed polymers of hydroxyalkyl acrylate or methacrylate can be polymerized in bulk, in water, or in a water soluble or water insoluble solvent. The polymer as a solution or in solid form is then dissolved or dispersed in the aqueous dispersion medium, i.e., the water in which the process of the invention is conducted, plus the addition of surfactants, buffers and catalysts. Preferably, the polymer of hydroxyalkyl acrylate or methacrylate is added as an aqueous solution or as a solution in a water miscible organic solvent, since the polymer in this form is much easier to dissolve or disperse.

Preferably, the hydroxyalkyl acrylate or methacrylate polymer used as a protective colloid is polymerized in situ in the dispersing medium prior to the addition and polymerization of the ethylenically unsaturated monomers. In this method for conducting the process of this invention, the hydroxyalkyl acrylate or methacrylate monomer is dissolved or dispersed in the aqueous dispersing medium, a free radical polymerization catalyst is added, and the monomer is polymerized. The aqueous dispersing medium can be just the water which is to be used for the total dispersion, but preferably it is the water plus surfactants and buffer if a buffer is used. The catalyst can be a portion of the catalyst which is used to form the polymeric dispersion or it can be a different catalyst. By modifying the amount and type of catalyst that is used, by the use of chain transfer agents, by varying the temperature and the method of adding the catalyst, the molecular weight of the hydroxyalkyl acrylate or methacrylate polymer can be varied. Such variations affect the particle size of the resulting dispersion, the lower the molecular weight of the protective colloid, the lower the particle size of the dispersion.

After the hydroxyalkyl acrylate or methacrylate protective colloid is dissolved or dispersed in the dispersing medium, either by being added as a polymer or by being formed in situ, the dispersion polymerization is conducted by methods well known in the art. For example, all the monomers can be added and dispersed in the dispersing medium which contains, in addition to the water, surfactants and buffer if required. The catalyst can then be added either incrementally or all at once. Heating and agitation is then continued until the polymerization is completed. Preferably, the polymerization is conducted by adding the monomers and the catalyst incrementally to the dispersing medium, thereby controlling the rate of reaction. The reaction can be conducted at a temperature of 5°C. to 150°C., using pressure where necessary and, preferably, at a temperature of 50°C. to 90°C. The time for conducting the reaction will vary from about 2 hours to about 24 hours depending upon the batch size and reaction conditions.

By utilizing the process of this invention, aqueous dispersions have been made which exhibit flow properties that vary between thixotropy and dilatancy. Flow properties have been classified as Newtonian flow, where the shearing stress is directly proportional to the shearing strain; pseudoplastic flow, where shear stress decreases with shear strain; and dilatant flow, where shear stress increases with shear strain. A thixotropic system may display many of the characteristics of pseudoplastic or dilatant flow curves except that a hysteresis loop is encountered if the shear rate is first increased and subsequently again decreased to zero from some maximum value. The flow characteristics of an aqueous dispersion can be described by its Thixotropic Index. A Thixotropic Index of 1 indicates that the polymer dispersion has Newtonian flow properties, a value below 1 indicates thixotropic flow properties and above 1, dilatant flow properties.

The Thixotropic Index can be approximated by using a Brookfield viscometer to measure the viscosities of the dispersion at 25°C. The viscometer is run at its highest speed (200 RPM) and the largest spindle which will give a reading on the scale is selected. Using this spindle, the viscosity is recorded at speeds of 20, 40, 100 and 200 RPM, starting at the lowest and going to the highest speed. The Thixotropic Index is then calculated as follows:

$$\text{Thixtropic Index} = \frac{V_H}{V_L} = \frac{2 V_{200} - V_{100}}{2 V_{40} - V_{20}}$$

where $V_{200}$ is the viscosity at 200 RPM, etc. Accurate values for Thixotropic Index can only be obtained when a multipoint viscosity hysteresis loop is available on the test sample. These data can be obtained using such instruments as the Interchemical Rotational Viscometer. However, approximate values can be obtained using the Brookfield viscometer as described above.

By using the process of this invention, aqueous dispersions of synthetic polymers have been prepared which have Thixotropic Indices between about 0.2 to about 2.0. Dispersions having Thixotropic Indices which approach 1 when used as a paint have improved flow and levelling properties, but somewhat decreased sag properties.

In order to describe the invention in more detail, reference is made to the following examples. Parts and percentages unless otherwise defined are intended to mean parts and percentages by weight.

EXAMPLE 1

To a suitable reactor equipped with a mechanical agitator, a thermometer, a reflux condenser, a monomer addition funnel and a catalyst addition funnel were added 331.1 parts of deionized water, 1.0 part of sodium bicarbonate, 8.5 of Igepal CO-630 nonylphenoxypoly(ethyleneoxy)ethanol nonionic surfactant (a product of General Aniline and Film Corp.), 25.6 parts of Igepal CO-997 nonylphenoxypoly(ethylenoxy)ethanol nonionic surfactant at 70% solids in water (a product of General Aniline and Film Corp.) and 9.3 parts of Polystep B19 sodium alkyl ether sulfate anionic surfactant (29% active in water) (a product of Stepan Chemical Company). To the monomer addition funnel were added 362 parts of vinyl acetate and 63.9 parts of butyl acrylate. To the catalyst addition funnel were added a solution of 1 part of sodium persulfate and 100 parts of deionized water. Eight parts of hydroxyethyl acrylate were added to the reactor, agitation was begun, and the reactor contents were heated by means of a water bath. When the pot temperature reached 72°C., half of the catalyst solution was added. After holding the temperature at 72°C. for 10 minutes, slow addition of both monomers and catalyst solution was begun. This addition was completed after 4 hours while keeping the temperature at 72–76°C. The temperature was raised to 85°C. and 89.6 parts of deionized water were added. The resulting polymer dispersion had a Brookfield viscosity of 81 cps. at 25°C. (20 RPM, No. 2 Spindle), a % solids of 45.5 and a Thixotropic Index of 1.8. The polymer had excellent heat stability, as evidenced by no discoloration of the polymer after being heated at 150°C. for 1 hour.

Example 2

To a reactor equipped as described in Example 1 were added 336.2 parts of deionized water, 1 part of sodium bicarbonate, 10.1 parts of Igepal CO-630 surfactant, 30.3 parts of Igepal CO-997 surfactant and 11 parts of Polystep B19 surfactant. To the monomer addition funnel were added 420.4 parts of vinyl acetate and 74.1 parts of butyl acrylate. To the catalyst addition tube were added 1 part of sodium persulfate in 100 parts of water. Sixteen parts of hydroxyethyl acrylate were added to the reactor, agitation was begun and heating by water bath was started. When the pot temperature reached 72°C., addition of the catalyst solution was begun at a rate of 1 part per minute. After 30 minutes with the temperature at 72°C., 20 parts of catalyst solution were added all at once. After 5 minutes, the slow addition of the monomers and the remaining catalyst solution was begun. This addition was continued for 4 hours while keeping the temperature between 70°C. and 77°C. When the addition was completed, the temperature was raised to 85°C. and was held at 85°C. for 30 minutes. The resulting polymer dispersion had a Brookfield viscosity of 610 cps. at 25°C. (200 RPM, No. 2 Spindle), a solids content of 55.1% and a Thixotropic Index of 0.84. Films drawn down on glass with a 3 mil doctor blade, after drying overnight, were clear, tack free, smooth and glossy.

EXAMPLE 3

To a reactor equipped as described in Example 1 were added 333.1 parts of deionized water, 1 part of sodium bicarbonate, 10 parts of Igepal CO-630 surfactant, 30.3 parts of Igepal CO-997 surfactant and 11 parts of Polystep B-19 surfactant. To the monomer addition funnel were added 429.8 parts of vinyl acetate and 75.8 parts of butyl acrylate. To the catalyst addition funnel were added 1 part of sodium persulfate in 100 parts of deionized water. Eight parts of hydroxyethyl methacrylate and half of the catalyst solution were added to the reactor, agitation was begun and heat was applied. When the pot temperature reached 73°C., addition of the monomers and the remaining catalyst solution was begun. The addition was continued over 4 hours while keeping the temperature between 69°C. and 76°C. After the addition was completed, the temperature was raised to 85°C. and was held at 85°C. for 30 minutes. The resulting polymer dispersion had a solids content of 54.6%, a Brookfield viscosity at 25°C. of 2900 cps. (20 RPM, No. 2 Spindle) and a Thixotropic Index of 0.7. Films prepared from the dispersion were well coalesced, smooth and clear.

EXAMPLE 4

To a reactor equipped as described in Example 1 were added 331.1 parts of deionized water, 1 part of sodium bicarbonate, 10 parts of Igepal CO-630 surfactant, 30.3 parts of Igepal CO-997 surfactant, and 11.0 parts of Polystep B-19 surfactant. To the monomer addition funnel were added 429.8 parts of vinyl acetate and 75.8 parts of butyl acrylate. To the catalyst addition funnel was added 1 part of sodium persulfate in 100 parts of deionized water. Eight parts of beta-hydroxypropyl methacrylate and half of the catalyst solution were added to the reactor, agitation was begun and heat was applied. When the temperature reached 72°C., it was held there for 10 minutes, after which the addition of monomers and the remaining catalyst solution was begun. These additions were continued over a 4 hour period while keeping the temperature between 72° and 77°C. After the addition was completed, the temperature was raised to 85°C. and was held at 85°C. for 30 minutes. The resulting polymer dispersion had a solids content of 55.3%, a Brookfield viscosity at 25°C. of 300 cps. (20 RPM, No. 2 Spindle) and a Thixotropic Index of 0.85.

EXAMPLE 5

To a suitable reactor equipped as described in Example 1 were added 333.1 parts of deionized water, 1 part of sodium bicarbonate, 10 parts of Igepal CO-630 surfactant, 30.3 parts of Igepal CO-997 surfactant and 11.0 parts of Polystep B-19 surfactant. To the monomer addition funnel were added 429.8 parts of vinyl acetate and 75.8 parts of butyl acrylate. To the catalyst addition funnel were added 1 part of sodium persulfate in 100 parts of deionized water. Eight parts of hydroxypropyl acrylate and half of the catalyst solution were added to the reactor, agitation was begun and heating was applied. When the temperature of the reactants reached 72°C., the slow addition of the monomers and the remaining catalyst solution was begun. The addition was continued for 4 hours while keeping the temperature between 71° and 75°C. After completion of the addition, the temperature was raised to 85°C. and was held at 85°C. for 30 minutes. The resulting polymer dispersion had a solids content of 54.8%, a Brookfield viscosity at 25°C. of 170 cps. (20 RPM, No. 2 Spindle) and a Thixotropic Index of 1.2.

EXAMPLE 6

To a suitable reactor equipped as described in Example 1 were added 331.1 parts of deionized water, 1 part of sodium bicarbonate, 8.5 parts of Igepal CO-630 surfactant, 25.6 parts of Igepal CO-997 surfactant and 9.3 parts of Polystep B19 surfactant. To the monomer addition funnel were added 362 parts of vinyl acetate and 63.9 parts of butyl acrylate. To the catalyst addition funnel were added 1 part of sodium persulfate in 100 parts of deionized water. Eight parts of hydroxyethyl acrylate were added to the reactor, agitation was begun and heat was applied. When the temperature reached 72°C., addition of the catalyst solution was begun at a rate of 1 part per minute. After 30 minutes with the temperature at 72°C., 20 parts of catalyst solution were added all at once. After 10 minutes while holding the temperature at 72°C., slow addition of the monomers and the remaining catalyst solution was begun. These additions were continued over 3 hours and 40 minutes while keeping the temperature between 72° and 76°C. After completion of the addition, 89.6 parts of deionized water were added, the temperature was raised to 85°C. and was held at 85°C. for 30 minutes. The resulting polymer dispersion had a solids content of 46.1%, a Brookfield viscosity at 25°C. of 45 cps. (20 RPM, No. 2 Spindle) and a Thixotropic Index of 2.0.

EXAMPLE 7

To a suitable reactor equipped as described in Example 1 were added 420.7 parts of deionized water, 1.0 part of sodium bicarbonate, 8.5 parts of Igepal CO-630 surfactant, 25.6 parts of Igepal CO-997 surfactant and 9.3 parts of Polystep B19 surfactant. To the monomer addition funnel were added 362 parts of vinyl acetate and 63.9 parts of butyl acrylate. To the catalyst addition funnel were added 1 part of sodium persulfate in 100 parts of deionized water. Eight parts of hydroxyethyl acrylate were added to the reactor, agitation was begun and heat was applied. When the temperature reached 73°C., 50 parts of the catalyst solution were added. The temperature was held at 73°C. for 10 minutes after which time the slow addition of the monomers and the remaining catalyst solution was begun. The addition was continued over a 4 hour period while keeping the temperature between 73°C. and 77°C. After the additions were completed, the temperature was raised to 85°C. and was held at 85°C. for 30 minutes. The resulting polymer dispersion had a solids content of 46.1%, a Brookfield viscosity of 55 cps. at 25°C. (20 RPM, No. 2 Spindle) and a Thixotropic Index of 1.7.

EXAMPLE 8

To a suitable reactor equipped as described in Example 1 were added 318.5 parts of deionized water, 1 part of sodium bicarbonate, 28.2 parts of Igepal CO-997 surfactant and 7.3 parts of Igepal CO-430 nonionic surfactant. To the monomer addition funnel were added 496.8 parts of vinyl acetate and 43.2 parts of butyl acrylate. To the catalyst addition funnel were added 1 part of sodium persulfate in 100 parts of deionized water. Four parts of hydroxyethyl acrylate and 10 parts of the catalyst solution were added to the reactor, agitaton was begun and heat was applied. When the temperature reached 72°C., 40 parts of catalyst solution were added and slow addition of the monomers and remaining catalyst solution was begun. The additions were completed in 4 hours while keeping the temperature between 71° and 75°C. The temperature was then raised to 85°C. and was held at 85°C. for 30 minutes. The resulting polymer dispersion had a Thixotropic Index of 0.9. Films prepared from the dispersion were well coalesced, smooth, clear, and exhibited excellent adhesion.

EXAMPLE 9

To a suitable reactor equipped as described in Example 1 were added 333.1 parts of deionized water, 1 part of sodium bicarbonate, 30.3 parts of Igepal CO-997 surfactant, 10 parts of Igepal CO-630 surfactant and 11.0 parts of Polystep B-19 surfactant. To the monomer addition funnel were added 429.8 parts of vinyl acetate and 75.8 parts of butyl acrylate. To the catalyst addition funnel were added 1 part of sodium persulfate in 100 parts of water. Eight parts of hydroxyethyl acrylate were added to the reactor, agitation was begun and heat was applied. When the temperature reached 50°C., 50 parts of catalyst solution were added. The temperature was held at 50°C. for 10 minutes and was then raised to 72°C. over a period of 15 minutes. After this time, slow addition of the monomers and the remaining catalyst solution was begun. The additions were completed in 4 hours while keeping the temperature between 70° and 75°C. The temperature was then raised to 90°C. and was held at 90°C. for 30 minutes. The resulting polymer dispersion had a solids content of 55.6% and a Brookfield viscosity at 25°C. of 200 cps. (20 RPM, No. 2 Spindle).

EXAMPLE 10

To a suitable reactor were added 333.1 parts of deionized water, 1 part of sodium bicarbonate, 30.3 parts of Igepal CO-997 surfactant, 10.0 parts of Igepal CO-630 surfactant and 11.0 parts of Polystep B-19 surfactant. To the monomer addition funnel were added 429.8 parts of vinyl acetate and 75.8 parts of butyl acrylate. To the catalyst addition funnel were added 1 part of sodium persulfate in 100 parts of deionized water. Eight parts of hydroxyethyl acrylate were added to the reactor, agitation was begun and heat was applied. When the temperature reached 90°C., 50 parts of catalyst solution were added. The temperature was held at 90°C. for 10 minutes and was then lowered to 72°C. At 72°C., slow addition of the monomers and the catalyst solution was begun. The additions were continued over a 4 hour period while keeping the temperature between 72° and 74°C. After the completion of the additions, the temperature was raised to 90°C. and was held at 90°C. for 30 minutes. The resulting polymer dispersion had a solids content of 55.9% and a Brookfield viscosity of 1750 cps. at 25°C. (20 RPM, No. 2 Spindle).

EXAMPLE 11

To a suitable reactor equipped as described in Example 1 were added 331.1 parts of deionized water, 1 part of sodium bicarbonate, 8.5 parts of Igepal CO-630 surfactant, 25.6 parts of Igepal CO-997 surfactant and 9.3 parts of Polystep B19 surfactant. To the monomer addition funnel were added 362 parts of vinyl acetate and 63.9 parts of butyl acrylate. To the catalyst addition funnel were added 1 part of sodium persulfate and 100 parts of deionized water. Seven parts of hydroxyethyl acrylate and 1 part of acrylic acid were added to the reactor, agitation was begun and heat was applied. At 72°C., 50 parts of catalyst solution were added. The temperature was held at 72°C. for 10 minutes after which time slow addition of monomers and the remaining catalyst solution was begun. The additions were completed after 4 hours while keeping the temperature between 72°C. and 74°C. Deionized water, 89.6 parts, was added, the temperature was raised to 85°C. and was held at 85°C. for 30 minutes. The resulting polymer dispersion had a solids content of 46.3, a Brookfield viscosity at 25°C. of 79 cps. (20 RPM, No. 2 Spindle), a Thixotropic Index of 1.2 and a pH of 4.5.

EXAMPLE 12

To a suitable reactor equipped with a mechanical agitator, a thermometer, a reflux condenser, an activator addition funnel and a pre-emulsion addition container were added 383.45 parts of water and 8 parts of hydroxyethyl acrylate. To the pre-emulsion container was added a pre-emulsion of 215 parts of isobutyl acrylate, 215 parts of methyl methacrylate, 28.5 parts of Igepal CO-897 nonylphenoxypoly(ethyleneoxy)ethanol nonionic surfactant at 70% solids in water (a product of General Aniline and Film Corp.), 10 parts of Igepal CO-530 nonylphenoxypoly(ethylenoxy)ethanol nonionic surfactant, 0.9 part of tertiary butyl hydroperoxide (90% active) and 100 parts of water. To the activator addition funnel was added a solution of 0.65 part of sodium sulfoxylate formaldehyde in 33 parts of water. Heat was applied to the reactor and when the reactor contents reached 65°C., 0.5 part of sodium persulfate in 5 parts of water was added. After 15 minutes at 65°C., 8 parts of the activator solution was added. Slow additions of the pre-emulsion and of the remaining activator solution were begun and continued for 2.5 hours while keeping the temperature between 65°C. and 70°C. At the end of the addition, the temperature was held at 65°C. for 30 minutes to complete the polymerization reaction. The product was then cooled and packaged. The product had a Brookfield viscosity of 23 cps. at 25°C., a Thixtropic Index of 2.0 and a solids content of 36.5%.

The aqueous dispersions prepared by the process of this invention have been made into paints for use as decorative and protective coatings, into adhesives and have been used in various textile applications.

It is to be understood that the foregoing detailed description is given merely by way of illustraton and that many variations may be made therein without departing from the spirit of the invention.

What is claimed is:

1. In the process for preparing a stable dispersion of polymers of ethylenically unsaturated monomers selected from the group consisting of vinyl esters of organic acids having two to eighteen carbon atoms, esters of polymerizable unsaturated mono and polycarboxylic acids wherein the ester group contains one to eighteen carbon atoms and the acid contains three to 10 carbon atoms and mixtures thereof which comprises reacting at a temperature of about 50°C. to about 90°C. a dispersion of said monomers in water using about 75 to about 125 parts by weight of water per 100 parts of weight of monomers in the presence of a protective colloid and an anionic or nonionic surfactant or mixture thereof with a free radical polymerization catalyst under polymerization conditions, the improvement which comprises using as the protective colloid in the amount of about 0.2 to about 2 weight percent based on the total weight of the dispersion a polymer of a hydroxyalkyl acrylate or methacrylate wherein the alkyl group contains 2 to 4 carbon atoms.

2. The process of claim 1 wherein the amount of protective colloid is 0.4 to 1.6 weight percent.

3. The process of claim 1 wherein the protective colloid is a polymer of hydroxyethyl acrylate.

4. The process of claim 1 wherein the polymer of hydroxyalkyl acrylate or methacrylate is preformed and is added as a polymer to the water prior to the polymerization of the ethylenically unsaturated monomers.

5. The process of claim 1 wherein the polymer of hydroxyalkyl acrylate or methacrylate is polymerized in situ in the water prior to the polymerization of the ethylenically unsaturated monomers.

6. The process of claim 5 wherein the hydroxyalkyl acrylate is hydroxyethyl acrylate.

7. The process of claim 1 wherein the ethylenically unsaturated monomer is vinyl acetate.

8. The process of claim 1 wherein the ethylenically unsaturated monomers are a mixture of vinyl acetate and an alkyl acrylate, dialkyl maleate, or dialkyl furmarate, wherein the alkyl group contains 4 to 8 carbon atoms, in the weight ratio of vinyl acetate to alkyl compound of 90:10 to 50:50.

9. The process of claim 8 wherein the alkyl acrylate is n-butyl acrylate.

10. The process of claim 1 wherein the ethylenically unsaturated monomers are alkyl acrylates or methacrylates or mixtures thereof, wherein the alkyl group contains from 1 to 8 carbon atoms.

* * * * *